United States Patent Office 3,297,458
Patented Jan. 10, 1967

3,297,458
PLASTIC CHROME ORE
Harry M. Mikami, Norristown, Pa., assignor to E. J. Lavino and Company, Philadelphia, Pa., a corporation of Delaware
No Drawing. Filed June 5, 1964, Ser. No. 373,073
11 Claims. (Cl. 106—66)

This invention deals with plastic chrome refractory compositions which have stable rapid drying properties. More specifically it relates to plastic chrome ore compositions which may be rapidly heated without bloating, swelling, or rising effects.

Plastic chrome refractories also known as chrome plastics or plastic chrome ore are extremely useful materials because of the ease of emplacement into various structures where pre-formed bricks and shapes are difficult, if not impossible to install, such as between and around pipes, narrow corners, slits, troughs, and the like. Even in ordinary hearths or walls where brick could be installed, the chrome plastic or plastic chrome ores are often cheaper and faster to install, and do not require skilled masons or brick layers for installation.

Most plastic chrome ores consist mainly of natural chrome ore which in turn is predominantly the mineral chromite spinel, plus more or less silicate gangue. In addition to the chrome ore ingredient, there is generally a minor amount of clay mineral to give the body plasticity, and a liquid water solution of alkali silicate (generally sodium silicate) to provide plasticity, rammability and more important to give the body an air setting bond during the drying stage. On heating to operating temperatures in steel making furnaces, forging furnaces, heat treating furnaces, ceramic kilns and the like, the alkali silicate and clay become part of the total silicate or ceramic bond of the body. Besides natural chrome ores there are also synthetic chrome refractory compositions used in plastic chrome refractories.

It has been found with some plastic chrome ores in certain applications that during the period of initial heating up of a furnace, oven or kiln in which it has been installed, that swelling or raising of the mass takes place. This is caused by the fact, that although the installed material has been vented by perforations from the surface inwards still the heating rate is too rapid to permit easy escape of water vapor so that the body swells or rises in much the same manner that bread or biscuit dough rise by the action of yeast or leavening. It would be possible by a very long period of air drying at room temperature followed by a slow controlled temperature to effect drying and hardening of the plastic chrome ore without any swelling or rising or bloating. The water would be driven off through the body without structurally distorting or deforming effects, but in modern industrial practice time is valuable and furnace operators want to put the heat on as soon as possible after the installation. A long drying period is not considered economical because it detracts from the production use of the equipment.

One of the causes of bloating or rising of installed plastic chrome ore is that drying with consequent air setting begins immediately after the material is emplaced. This causes a tendency towards sealing the surface against permeation of the water vapor from deeper in the body to the outside air. This surface or skin effect accentuates the bloating or rising effect.

It is virtually unavoidable in actual commercial practice for all or parts of an installation of plastic chrome ore to have some air drying and setting at the surface before the fuel can be applied. Therefore, there will be more or less a surface sealing effect that will accentuate the bloating or rising action when heat is applied.

It is therefore an object of the present invention to produce a plastic chrome refractory composition which will not bloat, swell or rise under conditions or rapid heating.

Another object of the present invention is to set forth a novel plastic chrome ore composition.

A further object of the present invention is to produce a plastic chrome ore composition which will not bloat by adding to the refractory composition flock or asbestos in minor amounts.

A still further object of the present invention is to set forth a method of preventing bloating in chrome ore compositions.

Other objects and advantages of the instant invention will become more apparent from the following detailed description and examples.

From chemical and physical considerations, numerous materials were selected for trial as an additive to correct the bloating problem. At the same time that the bloating was corrected, however, the material had to be compatible with respect to storageability, refractoriness, rammability and other desirable properties and characteristics previously mentioned. This condition eliminated many additive materials.

Two material additives have been found which, when added to plastic chrome ores, have successfully met all the required conditions outlined above. These additive materials are chemically and physically compatible with all plastic chrome ores or chrome plastics with regard to physical structure, plasticity, rammability, chemical composition, refractoriness, storageability, or shelf-life, safety in handling and appearance. These are asbestos and flock. The asbestos is a fibrous silicate mineral and may be of the amphibole variety, or of the serpentine (chrysotile) variety. Either will work, but for economic reasons at the present time serpentine variety may be preferable. The flock material is a short fine cotton fiber commercially known as "floc." This material consists of rayon or cotton fibers of small cross section or short lengths. Preferably the lengths are of from 0.05 to 0.10 millimeter and cross sections of 0.001 to 0.003 millimeter in diameter.

Examples of plastic chrome ore compositions that may be rapidly heated without bloating, swelling or rising effects are as follows.

EXAMPLE I

|  | Parts by weight |
|---|---|
| Chrome Ore | 87 |
| Liquid Sodium Silicate Solution | 7 |
| Kaolin Clay | 3 |
| Asbestos | 1 |

Water as required for property plasticity. This may vary depending on what range of plasticity may be required. Typically 3–5 parts.

Asbestos in this example was Serpentine or Chrysotile variety of the Milled Asbestos Grade No. 7k classified according to the "Quebec Standard Test," which is well known in the asbestos industry. Many grades of asbestos have been used to give successful test results in the laboratory. Milled Asbestos classified as waste, shorts, and fibres may be used. Preference is given to shorts because of ease of dispersion and favorable economics.

EXAMPLE II

|  | Parts by weight |
|---|---|
| Chrome Ore | 87 |
| Liquid Sodium Silicate Solution | 7 |
| Kaolin Clay | 3 |
| Floc | 1 |

Water, see Example I.

EXAMPLE III

| | Parts by weight |
|---|---|
| Chrome Ore | 86.7 |
| Kaolin Clay | 3 |
| Liquid Sodium Silicate | 9.3 |
| Asbestos | 1.1 |
| Water, as required. | |

Chrome Ore Sizing, about 25% on 8 mesh; about 35% minus 200 mesh.

EXAMPLE IV

| | Parts by weight |
|---|---|
| Chrome Ore | 88.7 |
| Liquid Sodium Silicate Solution | 7.2 |
| Kaolin Clay | 3.1 |
| Asbestos | 1.0 |
| Floc | — |
| Water, as required. | |

EXAMPLE V

| | Parts by weight |
|---|---|
| Chrome Ore | 88.7 |
| Liquid Sodium Silicate Solution | 7.2 |
| Kaolin Clay | 3.1 |
| Asbestos | — |
| Floc | 1.0 |
| Water, as required. | |

EXAMPLE VI

| | Parts by weight |
|---|---|
| Chrome Ore | 87.0 |
| Liquid Sodium Silicate Solution | 9.3 |
| Kaolin Clay | 2.6 |
| Asbestos | 1.1 |
| Floc | — |
| Water, as required. | |

The above examples set forth preferred compositions, however, the ranges of the constituents may vary according to the following: The chrome ore may vary from 75 to 92 parts; liquid sodium silicate solution from 4 to 12 parts; clay from 1 to 10 parts; asbestos or flock 0.5 to 3 parts; and water as required. In the above compositions, bentonite clay may be substituted for the kaolin clay set forth.

The problem of bloating or rising of plastic chrome ores in the actually industrial installation has been investigated in numerous plants. In order to subject the material under controlled laboratory conditions such that the bloating mechanism that operates in the field a simple test has been devised. This consists of ramming a quantity of subject plastic chrome ore into a metal container or enclosure with only one surface opening. A standard cylindrical one gallon or one quart can with the top or cover has been found very suitable for this purpose. The subject material is rammed flush with the open top of the can and perforated with ⅛ inch diameter holes to a depth of 2 inches. The container is allowed to stand at room temperature for 48 hours and then placed in an oven uniformly heated to 250° F. and allowed to remain there for 16 hours. The air drying period makes the test more severe by forming a surface crust. It is then removed and observed for bloating or rising effects.

In developing this test, a wide range of temperatures was tried, but the results obtained described above correlated with the actual effects experienced by the material in the industrial applications. By careful measurement of temperatures in the hearths of large furnaces during heat-up it was found that all bloating and rising effects and actions took place by the time the material had attained a temperature of 250° F. Only the gas forming material in the plastic chrome ore in this temperature range is water vapor, so it must be concluded that the problem is one of evolving and releasing water without disruption, distention or deformation of the emplaced structure.

The compositions of Examples I and II were rammed in containers according to the test set out above and allowed to stand at room temperature for 48 hours and then placed in an oven maintained at 250° F. for 16 hours. Another container was filled with a chrome ore composition having the same constituents as Examples I and II, but without either asbestos or flock. This sample was tested in the same oven along with Examples I and II. On removal from the oven, it was noted that Examples I and II showed no bloating; however, the control sample showed severe bloating.

The amount of asbestos to be added may vary according to the severity of the bloating problem. One percent has been found a very satisfactory amount for many mixes, but it may be reduced to 0.5 percent in some mixes with lesser bloating tendencies or to 3 percent for extra severe bloating mixes.

It is apparent from the foregoing that there is provided a new and novel chrome ore composition and method for solving the problem of bloating of chrome ore refractories molded in situ under conditions of rapid heating. These chrome ore refractories may be used in various structures where pre-formed bricks and shapes are difficult to install such as hearths, around pipes, corners, slits, and troughs without the necessity of skilled masons or brick layers for installation.

Although the invention is applied mainly to a class of refractories called plastic chrome ore, it is conceivable that bloating problems in other ramming mixes or castable refractories such as Lithochrome can be solved by the additions disclosed above.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:
1. A chrome ore refractory composition consisting essentially of from 75 to 92 parts chrome ore, from 4 to 12 parts liquid sodium silicate solution, from 1 to 10 parts clay, from 0.5 to 3 parts fiber selected from the group consisting of flock and asbestos, the remainder water, all of said parts being by weight of the total composition.

2. The composition of claim 1, wherein the chrome ore is of the size that 75 percent will pass through an 8 mesh screen and 35 percent will pass through a 200 mesh screen.

3. A chrome ore refractory composition consisting essentially of from 75 to 92 parts chrome ore, from 4 to 12 parts liquid sodium silicate solution, from 1 to 10 parts clay selected from the group consisting of kaolin and bentonite, from 0.5 to 3 parts fiber selected from the group consisting of asbestos and flock, and the remainder water, all of said parts being by weight of the total composition.

4. A chrome ore refractory composition consisting essentially of chrome ore 87 parts, liquid sodium silicate solution 7 parts, kaolin clay 3 parts, flock 1 part, the remainder water, all of said parts being by weight of the total composition.

5. The composition of claim 4, wherein the flock is from 0.05 to 0.10 mm. in length and from 0.001 to 0.003 mm. in diameter.

6. A refractory chrome ore composition consisting essentially of 86.7 parts chrome ore, 2.6 parts kaolin clay, 9.3 parts liquid sodium silicate, 1.1 parts asbestos, and the balance water, all of said parts being by weight of the total composition.

7. A method of preventing bloating in chrome ore refractories consisting essentially of 72 to 92 parts chrome ore, 4 to 12 parts liquid sodium silicate solution, 1 to 10 parts kaolin clay and sufficient water to give desired plasticity comprising adding to the chrome ore refractories from 0.5 to 3 percent fiber.

8. A refractory chrome ore composition consisting essentially of 88.7 parts chrome ore, 7.2 parts liquid sodium silicate solution, 3.1 parts kaolin clay, and 1.0 part fiber selected from the group consisting essentially of asbestos and flock, said parts being by weight of the total composition.

9. The composition of claim 8, containing sufficient water to give the desired plasticity to the composition.

10. A chrome ore refractory composition consisting essentially of 87 parts chrome ore, 9.3 parts liquid sodium silicate solution, 2.6 parts kaolin clay, and 1.1 parts asbestos, said parts being by weight of the total composition.

11. The composition of claim 10, containing sufficient water to give the desired plasticity to the composition.

References Cited by the Examiner

UNITED STATES PATENTS

| | | | |
|---|---|---|---|
| 2,792,311 | 5/1957 | Davies | 106—66 |
| 2,965,505 | 12/1960 | Mikami | 106—59 |
| 3,201,501 | 8/1965 | Cook et al. | 106—59 |

TOBIAS E. LEVOW, *Primary Examiner.*

J. E. POER, *Assistant Examiner.*